US008385487B2

(12) United States Patent
Tomatis et al.

(10) Patent No.: US 8,385,487 B2
(45) Date of Patent: Feb. 26, 2013

(54) RECEIVE DIVERSITY SYSTEMS

(75) Inventors: Fabrizio Tomatis, Saint Laurent du Var (FR); Pietro Di Paola, Turin (IT)

(73) Assignee: ST-Ericsson SA, Geneva (CH)

( * ) Notice: Subject to any disclaimer, the term of this patent is extended or adjusted under 35 U.S.C. 154(b) by 321 days.

(21) Appl. No.: 12/747,136

(22) PCT Filed: Dec. 9, 2008

(86) PCT No.: PCT/EP2008/010444
§ 371 (c)(1),
(2), (4) Date: Nov. 11, 2010

(87) PCT Pub. No.: WO2009/074291
PCT Pub. Date: Jun. 18, 2009

(65) Prior Publication Data
US 2011/0122931 A1    May 26, 2011

(30) Foreign Application Priority Data

Dec. 10, 2007  (EP) .................................... 07122790

(51) Int. Cl.
*H04B 7/10*    (2006.01)
(52) U.S. Cl. ...................................................... 375/347
(58) Field of Classification Search .................. 375/148, 375/316, 329, 347
See application file for complete search history.

(56) References Cited

U.S. PATENT DOCUMENTS

| | | | |
|---|---|---|---|
| 5,761,613 A | 6/1998 | Saunders et al. | |
| 6,888,878 B2 | 5/2005 | Prysby et al. | |
| 2004/0042532 A1* | 3/2004 | Artamo et al. | 375/148 |
| 2007/0189410 A1 | 8/2007 | Zeng | |
| 2009/0190645 A1* | 7/2009 | Li et al. | 375/229 |
| 2009/0238247 A1* | 9/2009 | Verzegnassi et al. | 375/148 |
| 2012/0147995 A1* | 6/2012 | Dawid et al. | 375/316 |

FOREIGN PATENT DOCUMENTS

| | | |
|---|---|---|
| WO | 2007/138516 A1 | 12/2007 |
| WO | WO 2007138516 | 12/2007 |

OTHER PUBLICATIONS

PCT International Search Report, PCT/EP2008/010444, mailing date Jan. 4, 2009, 2 pages, European Patent Office, Rijswijk, NL.

(Continued)

*Primary Examiner* — Jaison Joseph
(74) *Attorney, Agent, or Firm* — William J. Kubida; Hogan Lovells US LLP

(57) ABSTRACT

A diversity receiver and a method of recovering symbols in a diversity receiver system comprises receiving first and second signals at first and second antenna elements. The first signal comprises first and second consecutive symbols modified by a first channel coefficient and the second signal comprises the first and second symbols modified by a second channel coefficient. The first and second signals are delayed and the first and second channel coefficients are estimated by applying the delayed first and second signals to a master Rake finger having first and second outputs for the estimated the first and second channel coefficients. A complex conjugate of the estimated second channel coefficient is produced. First and second composite signals are produced from the delayed first and second signals using a slave Rake finger by decoding the respective delayed first and second signals, producing a complex conjugate of the second composite signal, interleaving the first composite signal and the complex conjugate of the second composite signal and providing an interleaved signal output, and applying said interleaved signal output, the estimated first channel coefficient and the complex conjugate of the estimated second channel coefficient to a space time transmit diversity derotator for the recovery of the first and second symbols.

10 Claims, 2 Drawing Sheets

OTHER PUBLICATIONS

Alamouti, Siavash M., A Simple Transmit Diversity Technique for Wireless Communications, IEEE Journal on Select Areas in Communications, vol. 16, No. 8, Oct. 1998, pp. 1451-1458.

Alamouti, Siavash M., A Simple Transmit Diversity Technique for Wireless Communications, IEEE Journal on Select Areas in Communications, Oct. 8, 1998, pp. 1451-1458, vol. 16, No. 8.

* cited by examiner

RECEIVE DIVERSITY SYSTEMS

This application claims the benefit of International Application No. PCT/EP2008/010444 filed Dec. 9, 2008 and European Patent Application No. 07122790.4 filed Dec. 10, 2007, both applications are incorporated by reference for all purposes as if fully set forth herein.

FIELD OF THE INVENTION

The present invention relates to receive diversity systems. The present invention has particular, but not exclusive, application to receivers of user equipments (UEs) for example, cellular telephones, for processing downlink signals, that is signals transmitted by base stations to the UEs. Receive diversity is one of the new features for the standard UMTS user equipment and is being defined in Release 7 of the 3GPP specifications.

In the present specification reference is made to complex signal and the complex conjugate of the complex signal. In order to facilitate the understanding of these terms a simple example is given in which a complex signal c is a signal composed of a real part a and an imaginary part jb, thus c=a+jb. A complex conjugate operation transforms the complex signal into its complex conjugate signal c*, thus c*=a−jb.

BACKGROUND OF THE INVENTION

Receive diversity is a simple technique which can be used to combat the fading effects due to multipath propagation in wireless communication systems. When two antennas are available at the receiver, information of the two radio channels can be exploited to provide increased reliability in data detection. Receive diversity techniques are well known and are widely adopted at the base station receiver (uplink) but not on the mobile equipment (downlink) since they have been considered too complex to implement in a low cost terminal. The complexity of receive diversity is due to the duplication of both the RF chain and base processing. In fact, to perform receive diversity is similar to having two User Equipments (UEs) in the same handset. Hence, a receive diversity with low complexity is recommendable for practical implementation in mobile terminals.

Proposals for reducing the cost and complexity of diversity receivers include U.S. Pat. No. 5,761,613 which discloses a receiver architecture comprising first and second reception branches coupled to respective antennas and including frequency down conversion means for frequency down converting respective radio frequency input signals to zero IF signals. The zero IF signals are digitised and combined in a maximal ratio combiner, the output from which is applied to a digital demodulator. In order to reduce the cost of the receiver the first and second branches are asymmetrical with say the first branch having a fully specified architecture and the second branch having a degraded architecture relative to the first branch by for example the omission of a first RF filter and an RF amplifier.

US Patent Publication No. US 2002/0126745 A1 discloses a receiver diversity architecture comprising a single antenna coupled to at least two Rake fingers. The Rake fingers are combined at chip level and then the combined signal is despread in a Walsh despreader to produce a symbol stream which is deinterleaved and decoded. The described diversity receiver is simpler and cheaper compared to an architecture in which each Rake finger includes its own despreader and produces time and phase corrected symbols which are combined, deinterleaved and decoded.

S. M. Alamouti "A Simple Transmit Diversity Technique for Wireless Communications" IEEE Journal on Select Areas in Communications, Vol. 16, No. 8, October 1998, Pages 1451 to 1458, discloses a simple two-branch transmit diversity scheme using two transmit antennas and one receive antenna. In the two transmit antenna/one receive antenna scheme disclosed in FIG. 2 of this article, two signals $s_0$ and $s_1$ are simultaneously transmitted a first symbol period from respective first and second antennas. In a second, consecutive symbol period the inverse complex conjugate of the signal $s_1$, that is $-s_1^*$, is transmitted from the first antenna and the complex conjugate of the signal $s_0$, that is $s_0^*$, is transmitted from the second antenna. The article also takes into consideration the additional matters of interference and noise and estimates of the respective signal channels and uses a maximum likelihood combiner to determine the values of $s_0$ and $s_1$. The disclosed scheme provides the same diversity order as maximal-ratio-receiver combining (MRRC) with one transmit antenna and two receive antennas. The described scheme does not require any bandwidth expansion and any feedback from the receiver to the transmitter, and its computation complexity is similar to MRRC.

The third generation mobile telephone system 3GPP, for example UMTS, requires the UE to have a Space Time Transmit Diversity (STTD) derotator which processes the signals received by two transmit antennas in two consecutive symbol periods and combines them to achieve a signal which has particular properties including an improved signal quality and thereby an improved receiver performance.

Reference is also made to unpublished PCT Patent Application IB 2007/051854 (Applicant's reference PH 005385EP1) which discloses a low cost and low complexity inner communication receiver which has an architecture enabling receiver diversity to be implemented using a STTD rotator. The receiver comprises first and second receive antennas for receiving first and second signals encoded with their respective channel coefficients. Each of the first and second signals comprises two consecutive signals occurring one symbol period apart. The first and second antennas are coupled by respective delay means to a master Rake receiver and a slave Rake receiver. For mobile receivers compliant with the 3GPP standard, the master Rake receiver is used in a classic estimation procedure which makes use of a pilot channel sequence (CPICH) for estimating the first and second channel coefficients. The slave Rake receiver is used to determine first and second auxiliary composite signals. The first and second auxiliary composite signals are combined with the estimates of the first and second channel coefficients to determine first and second output signals representative of the first and second symbols respectively times the sum of the first channel coefficient squared and the second channel coefficient squared. Although the described receiver enables the symbols to be recovered satisfactorily, a perceived drawback of the receiver architecture described is that the signals received from the first and second antennas in two consecutive time periods are summed doubling the noise power (3 dB loss), which loss is undesirable.

SUMMARY OF THE INVENTION

It is an object of the present invention to reduce the complexity in diversity receivers.

According to a first aspect of the present invention there is provided a diversity receiver comprising first and second antenna elements for receiving first and second signals, the first signal comprising first and second consecutive symbols modified by a first channel coefficient, the second signal comprising the first and second symbols modified by a second channel coefficient, first and second signal delay means coupled respectively to the first and second antenna elements, a master Rake finger having means for estimating the first and second channel coefficients, the master Rake finger having first and second inputs coupled respectively to the first and second delay means and first and second outputs respectively for estimates of the first and second channel coefficients, first complex conjugate transforming means coupled to the second output for producing the complex conjugate of the estimated second channel coefficient, and a slave Rake finger for determining the first and second symbols, wherein the slave Rake finger comprises first and second decoding means coupled respectively to the first and second delay means for producing respective first and second composite signals, second complex conjugate transforming means having an input for receiving the second composite signal and producing a complex conjugate of the second composite signal, parallel-to-serial conversion means for interleaving the first composite signal and the complex conjugate of the second composite signal and providing an interleaved signal output, and a space time transmit diversity derotator having inputs for receiving said interleaved signal output, the estimated first channel coefficient and the complex conjugate of the estimated second channel coefficient and for recovering the first and second symbols.

According to a second aspect of the present invention there is provided a method of recovering symbols in a diversity receiver system, the method comprising receiving first and second signals at first and second antenna elements, the first signal comprising first and second consecutive symbols modified by a first channel coefficient, the second signal comprising the first and second symbols modified by a second channel coefficient, delaying the first and second signals, estimating the first and second channel coefficients by applying the delayed first and second signals to a master Rake finger having first and second outputs for the estimated first and second channel coefficients, producing a complex conjugate of the estimated second channel coefficient, producing first and second composite signals from the delayed first and second signals using a slave Rake finger by decoding the respective delayed first and second signals, producing a complex conjugate of the second composite signal, interleaving the first composite signal and the complex conjugate of the second composite signal and providing an interleaved signal output, and applying said interleaved signal output, the estimated first channel coefficient and the complex conjugate of the estimated second channel coefficient to a space time transmit diversity derotator for the recovery of the first and second symbols.

The present invention is based on making use of STTD decoding, which is mandatory in 3GPP, to perform receive diversity decoding in a diversity system having a single transmit antenna and a UE having two receive antennas. In order to achieve diversity decoding, a signal applied to an input of a STTD derotator comprises a serial signal formed by combining the symbols from a master Rake finger having a descrambling/despreading chain and conjugated symbols from a slave Rake finger having a descrambling/despreading chain and a complex conjugate transforming means. The STTD derotator also has inputs for conjugated channel estimations from the respective receive antennas. An output of the STTD derotator may be down-sampled by a factor of two so that one sample is taken whilst the other sampled is discarded.

Compared to transmit diversity in which the signals from the respective transmit antennas are transmitted typically at half the power of signals transmitted from a single antenna, the two antennas receive each signal through channels with similar characteristics and the signal is received statistically with twice the strength, that is, there is a gain of 3 dB in the SNR which leads to an even greater gain in terms of the Block Error Rate (BLER) due to the non-linear behaviour of channel coding gain.

According to a third aspect of the present invention there is provided a wireless equipment comprising a transmitter and a diversity receiver in accordance with a first aspect of the present invention.

According to a fourth aspect of the present invention there is provided a cellular communications network comprising a least one base station having at least one transmitter for transmitting signals on a downlink to at least one wireless equipment in accordance with the third aspect of the present invention and at least one receiver for receiving signals transmitted on an uplink by the at least one wireless equipment.

BRIEF DESCRIPTION OF THE DRAWINGS

The present invention will now be described, by way of example, with reference to the accompanying drawings, in which.

In the drawings, apart from one exception, the same reference numerals have been used to indicate corresponding features The exception is the referencing of the radio channels between the stations at opposite ends of the wireless link.

DETAILED DESCRIPTION OF PREFERRED EMBODIMENTS

In order to facilitate an understanding of the method in accordance with the present invention and the receiver architecture of a UE made in accordance with the present invention features of receive and transmit diversity will be explained with reference to FIGS. 1 and 2.

Figure 1:
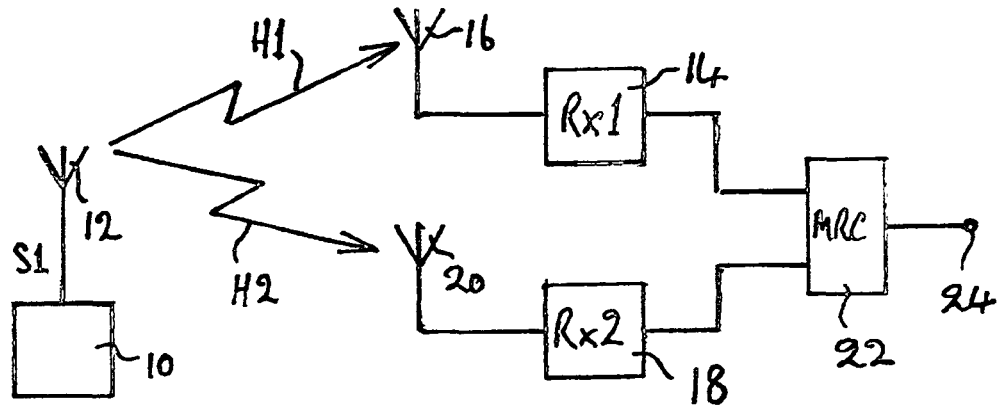
FIG. 1 illustrates schematically a receive diversity scheme in which Maximal Rate Combining (MRC) is used to exploit information from two receive antennas.

In FIG. 1 a base station transmitter 10 transmits a signal S1 from its antenna 12. The signal S1 is typically a UMTS signal which has been scrambled. Receivers 14, 18 having spatially separated receive antennas 16, 20, respectively, receive, descrambled and despread the signals received by the receive antennas and supply their outputs to a MRC stage 22 having an output terminal 24. The signal channels between the transmit antenna 12 and the respective receive antennas 16 are referenced H1, H2.

In operation, at a given time the baseband signals $R1_{MRC}$, $R2_{MRC}$ recovered by the receivers 14 and 18 are:

$$R1_{MRC} = S1 \cdot H1 + N1$$

$$R2_{MRC} = S2 \cdot H2 + N2 \quad (1)$$

where N1 and N2 represent complex noise and interference. If the channels H1, H2 are known at the receiver, the MRC stage 24 provides an estimation of the transmitted signal by weighting the signals received from the two antennas 16, 20 with the corresponding channel estimations shown below:

$$S1_{MRC\_est} = R1_{MRC} \cdot H1^* + R2_{MRC} \cdot H2^* =$$

$$S1 \cdot H1 \cdot H1^* + S1 \cdot H2 \cdot H2^* + N1 \cdot H1^* + N2 \cdot H2^* =$$

$$S1(|H1|^2 + |H2|^2) + N1 \cdot H1^* + N2 \cdot H2^* \quad (2)$$

where H1* and H2* are the complex conjugates of H1 and H2, respectively.

If the channels H1 and H2 are uncorrelated, the Maximal Ratio Combining improves the performance of the receiver since it adds reliability due to multiple receive chains (diversity gain). By using one transmit antenna 12 and two receive antennas 16, 20, the MRC achieves a diversity order equal to two over ideally uncorrelated fading channels.

Figure 2:
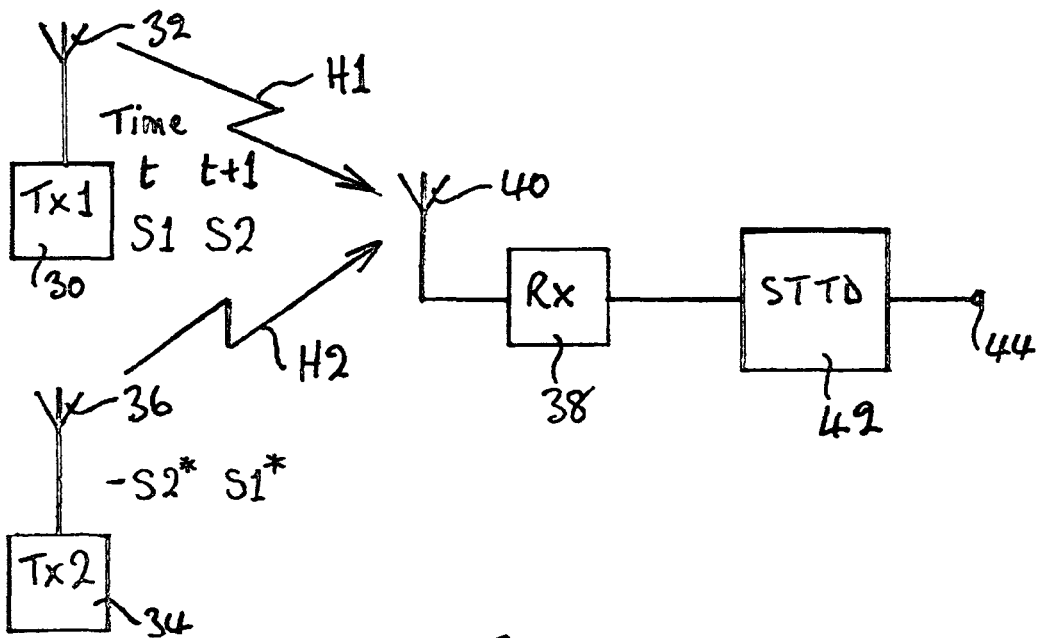
FIG. 2 illustrates schematically a transmit diversity scheme in which a STTD derotator is used to exploit information received at a single antenna.

Referring to FIG. 2, the space time transmit diversity system comprises first and second base station transmitters 30, 34 having transmit antennas 32, 36, respectively, and a receiver 38 having a receive antenna 40. The receiver 38 receives, descrambles and despreads the received signals and supplies them to a STTD stage 42 having an output 44. For convenience of notation in the following equations the radio channels between the transmit antennas 32 and 36 and the receive antenna will be referenced H1 and H2 but it should be understood that they are not the same channels as in FIG. 1. In the transmit diversity system two signals are transmitted and are separated by one symbol period. In a first symbol period t, signal S2 is sent by the transmit antenna 32 and the conjugate S1* is sent by the transmit antenna 36 and in the second symbol period t+1, signal S1 is sent by the transmit antenna 32 and the inverse conjugate of the signal S2, that is −S2*, is sent by the transmit antenna 36. Employing two transmit antennas 32, 36 adds redundancy both in the spatial domain and in the time domain.

The received signals $R1_{STTD}$ and $R2_{STTD}$ at the antenna 40 at the symbol time periods t and t+1 are respectively:

$$R1_{STTD} = S1 \cdot H1 - S2^* \cdot H2 + N1$$

$$R2_{STTD} = S2 \cdot H1 + S1^* \cdot H2 + N2 \quad (3)$$

The estimations of the symbols S1 and S2 are achieved, after two symbol periods, with a simple linear decoding (that is STTD derotation in which the received signals and the channel estimations are linearly combined to achieve sufficient statistics for a decision to be made in the following equations).

$$S1_{STTD\_est} = R1_{STTD} \cdot G1 + (R2_{STTD})^* \cdot G2 =$$

$$S1 \cdot (|H1|^2 + |H2|^2) + N1 \cdot H1^* + N2^* \cdot H2$$

$$S2_{STTD\_est} = (-R1_{STTD})^* \cdot G2 + R2_{STTD} \cdot G1 =$$

$$S2 \cdot (|H1|^2 + |H2|^2) - N1^* \cdot H2 + N2 \cdot H1^* \quad (4)$$

where $G1 = H1^*$ and $G2 = H2^*$.

In this analysis it has been implicitly supposed that the channels H1 and H2 do not change significantly across two symbol periods and can be perfectly estimated. It should be noted that the resulting combined signals $S1_{STTD\_est}$ and $S1_{MRC}$ are equivalent. The only difference is the phase rotations of the noise components which do not degrade the effective Signal to Noise Ratio (SNR). Hence, the receive diversity and transmit diversity schemes achieve theoretically the same performance but, in a practical implementation, STTD has a 3 dB performance loss with respect to a two-branch MRC since the two antennas transmit half of the power.

Figure 3:
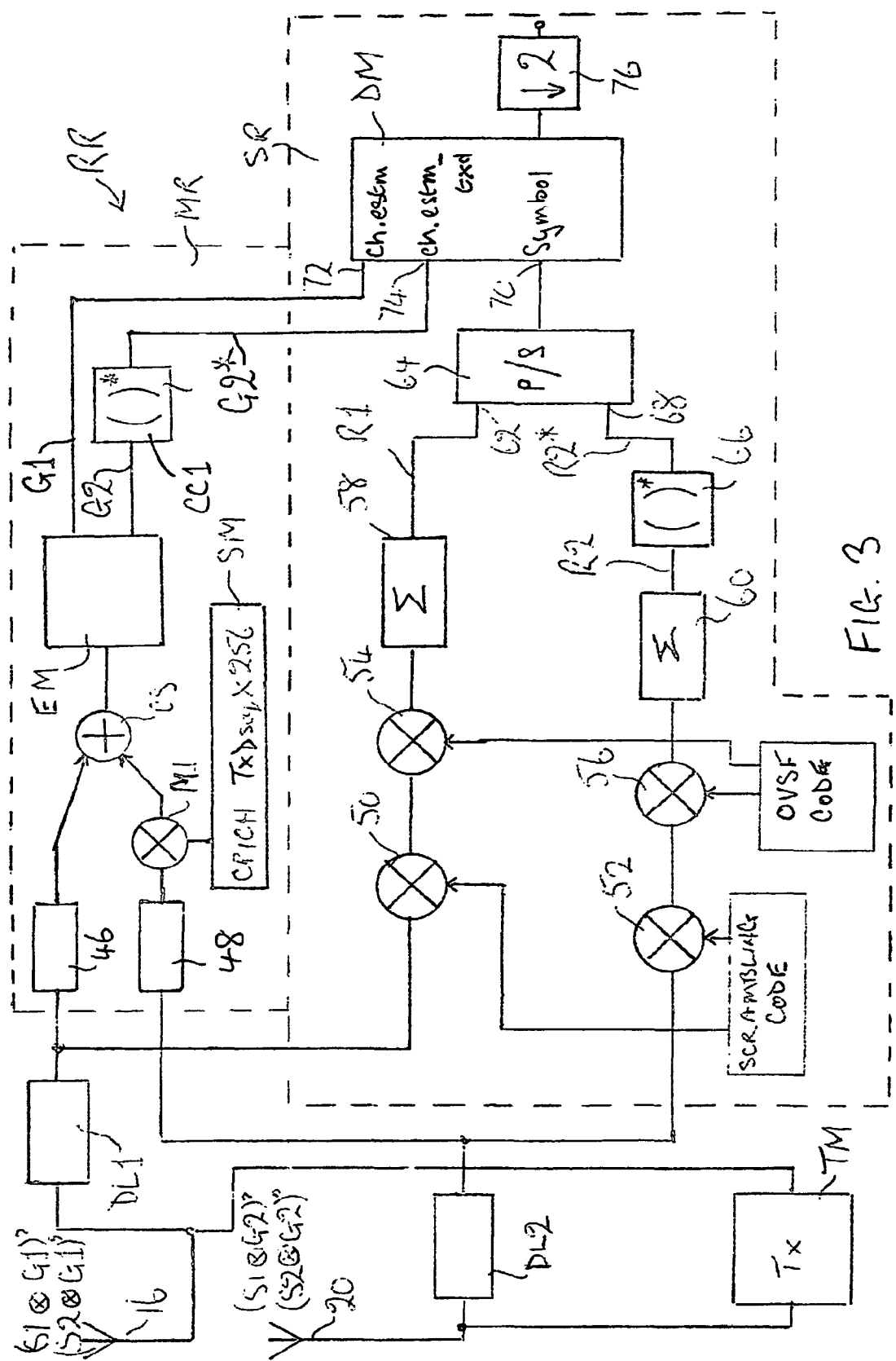
FIG. 3 is a block schematic diagram of an embodiment of a UE made in accordance with the present invention.

The embodiment of the present invention shown in FIG. 3 exploits the STTD derotator to perform receive diversity with maximal rate combining when two receive antennas are available at the UE. In order to be able to do this some very simple processing on the signal at the input of a derotator is necessary. In this solution a slave Rake derotator has to be set in the STTD mode thus making it impossible to support transmit diversity and receive diversity at the same time.

Referring now to FIG. 3 which illustrates an embodiment of a communication receiver RR made in accordance with the present invention. Such a communication receiver RR may be installed in mobile communication user equipment UE, such as a mobile telephone, adapted to radio communication in a UMTS network implementing receive diversity. It is important to notice that the receiver made in accordance with the invention is neither limited to this type of communication equipment nor to this type of communication network. Indeed, it applies to any wireless CDMA networks implementing receive diversity.

The UE is arranged to transmit and receive signals representative of data packets to and from a base station (Node B) of the UMTS network. As the present invention is concerned with the processing of the received signals by the communication receiver RR and is not concerned with the signals generated by the communication transmitter TM of the UE, then in the interests of brevity the transmitter will not be described in detail.

As schematically illustrated in FIG. 3 the communication receiver RR made in accordance with the invention comprises first and second antenna elements 16, 20, respectively, for receiving radio signals, first DL1 and second DL2 delay lines, a master Rake module MR and a slave Rake module SR including a combining module (sometimes called "derotator") DM. It is recalled that in a UMTS network implementing receive diversity, a base station (Node B) transmits to a mobile telephone UE signals representative of consecutive first S1 and second S2 symbols of information occurring at time t and t+1. First signals are received by a first antenna 16 with a first channel coefficient G1. Second signals also representative of the first S1 and second S2 symbols are received by a second antenna 20 with a second channel coefficient G2. The first antenna element 16 of the communication receiver RR is notably arranged to receive the first signals ((S1 ⊗ G1) and (S2 ⊗ G1)) while the second antenna element 20 of this communication receiver RR is notably arranged to receive the second signals ((S1 ⊗ G2) and (S2 ⊗ G2)).

It will be recalled from FIG. 2 where the diversity is of the STTD type ("Space Time Transmit Diversity"), the node B transmits to the UE receiver 38 by means of two antennas 32, 36 (FIG. 2). The receiver 38 (FIG. 2) or the receiver RR (FIG. 3) does not know the channel coefficients G1 and G2 corresponding to these two transmitted signals. So it has to estimate these channel coefficients G1=H1* and G2=H2* in order to be capable of retrieving the first S1 and second S2 symbols. The master Rake module MR is dedicated to channel coefficient estimate, while the slave Rake module SR is intended for determining first R1 and second R2 auxiliary composite symbols, which are used by the combining module DM with the channel coefficient estimate G1 and the complex conjugate of the estimate G2, that is G2*=H2**=H2, in order to retrieve the first S1 and second S2 symbols.

As is illustrated in FIG. 3, the first DL1 and second DL2 delay lines are fed with the first (digital) signals (S1 ⊗ G1)' and (S2 ⊗ G1)' and the second (digital) signals (S1 ⊗ G2)' and (S2 ⊗ G2)' received by the first 16 and second 20 antenna elements respectively. They are intended to delay the first and second (digital) signals respectively in order to introduce a chosen time shift between them. The delay lines are used to recover the delay due to the multipath. It is assumed that the multipath of the first 16 and second 20 antenna elements are perfectly synchronized (which is correct since they are collocated in the mobile communication receiver RR).

The first DL1 and second DL2 delay lines feed both the master Rake module MR and the slave Rake module SR with first ((S1⊗G1) and (S2⊗G1)) and second ((S1⊗G2) and (S2⊗G2)) delayed signals. For convenience of illustration, these delayed signals are applied to first and second descrambling and despreading stages 46, 48.

The master Rake module MR is also fed with a pilot channel sequence, which is for instance a CPICH ("Control Pilot Channel") transmit diversity sequence (notably defined in the technical specification TS 25.211 of the 3GPP). It is recalled that such a sequence is constituted by bits which are the combination of the full "1" sequence and of the STTD sequence pattern (−1,+1,+1,−1,−1,+1,+1,−1, . . . ). This encoding scheme is called Alamouti encoding in the literature.

The master Rake module MR preferably comprises a sampling module SM arranged to up-sample the pilot channel sequence (CPICH) at chip rate, i.e. 256 integrations (classical integration and dump operation).

The master Rake module MR is arranged to mix the delayed second signals from the delay line DL2 with the up-sampled pilot channel sequence (CPICH) in order to deliver correlated delayed second signals. The correlated delayed second signals are combined with the delayed first signals in a combining stage CS.

The master Rake module MR classically comprises an estimation module EM (sometimes called "master Rake block") which uses the delayed first signals and the correlated delayed second signals to estimate the first G1 and second G2 channel coefficients with the encoding of the transmitted signal known a priori.

The master Rake module MR may further comprise a processing module CC1 which is intended for applying a complex conjugation to the second channel coefficient estimate G2 output by the estimation module EM in order to convert this second channel coefficient estimate G2 into a second channel coefficient estimate complex conjugate G2*. The interest of this conversion will appear below.

The slave Rake module SR is fed with the delayed first and second signals which are applied to respective first inputs of multipliers 50, 52. A scrambling code sequence is applied to a second input of the multipliers 50, 52. The descrambled signals are applied to respective first inputs of multipliers 54, 56. An OVSF spreading code sequence is applied to second inputs of the multipliers 54, 56 in order to determine first R1 and second R2 auxiliary composite symbols.

For instance, the scrambling code sequence may be a gold code sequence and the spreading code sequence may be a Hadamard channelization code sequence (or OVSF).

The despread output of the multiplier 54 is summed in a first adding stage 58 to produce auxiliary composite signal R1. The first adding stage 58 functions as an integrate and dump stage serving to collect the energy of the chips when despread. The auxiliary composite signal R1 from the summing stage 58 is applied to a first input 62 of a parallel-to-serial converter 64 which functions as an interleaving stage. The despread output from the multiplier 56 is summed in a second adding stage 60, which also functions as an integrate and dump stage, to produce auxiliary composite signal R2. The auxiliary composite signal R2 from the second adding stage 60 is applied to a complex conjugate stage 66 and the output complex conjugate signal is applied to a second input 68 of the parallel-to-serial converter 64. An output from the parallel-to-serial converter 64 is applied together with the first channel coefficient G1 and the complex conjugate of second channel coefficient G2 to respective inputs 70, 72 and 74 of a STTD derotator stage DM. An output of the derotator stage DM is coupled to a down-sampling stage 76 for down-sampling the output by a factor of two, for example by taking alternate odd numbered samples and discarding the intervening even numbered samples.

If the STTD derotator stage DM is fed with the following signals:

$$R1_{STTD}=R1_{MRC}$$

$$R2_{STTD}=(R2_{MRC})^*$$

$$G1=H1^*$$

$$G2^*=H2 \qquad (5)$$

Equation (4) can be rewritten as:

$$S1_{STTD\_est}=(S1 \cdot H1=N1)\cdot H1^*=((S1\cdot H2+N2)^*)^*\cdot H2^*=$$

$$S1\cdot(|H1|^2+|H2|^2)+N1\cdot H1^*+N2\cdot H2^*=S1_{MRC\_est}$$

$$S2_{STTD\_est}=-(S1\cdot H1+N1)^*\cdot H2^*+(S1\cdot H2+N2)^*\cdot H1^*=$$

$$-S1^*\cdot H1^*\cdot H2^*-N1^*\cdot H2^*+S1^*\cdot H2^*\cdot H1^*+$$
$$N2^*\cdot H1^*=N2^*\cdot H1^*-N1^*\cdot H2^*$$

The first output of the STTD rotator is identical to the output of the MRC combiner while the second output is simply noise. Hence, at the first symbol period t, there are available sufficient statistics required for the detection of the transmitted symbol S1. The output of the derotator at the time t+1 does not carry any useful information and thus can be discarded by down-sampling the output by a factor of two in the stage 76. It is noteworthy that no delay is added since $R1_{MRC}$ and $R2_{MRC}$ (that is the input to the STTD derotator) are available at the first symbol period t and at the same symbol period is provided the estimation of the corresponding transmitted symbol.

In the present specification and claims the word "a" or "an" preceding an element does not exclude the presence of a plurality of such elements. Further, the word "comprising" does not exclude the presence of other elements or steps than those listed.

The use of any reference signs placed between parentheses in the claims shall not be construed as limiting the scope of the claims.

From reading the present disclosure, other modifications will be apparent to persons skilled in the art. Such modifications may involve other features which are already known in the design, manufacture and use of diversity receivers and component parts therefor and which may be used instead of or in addition to features already described herein.

The invention claimed is:

1. A diversity receiver, comprising:
   first and second antenna for receiving first and second signals, the first signal comprising first and second consecutive symbols modified by a first channel coefficient, the second signal comprising the first and second symbols modified by a second channel coefficient;
   first and second signal delay means coupled respectively to the first and second antenna elements;
   a master Rake finger means for estimating the first and second channel coefficients, the master Rake finger, comprising:
       first and second inputs coupled respectively to the first and second delay means and first and second outputs respectively for estimates of the first and second channel coefficients; and first complex conjugate transforming means coupled to the second output for producing the complex conjugate of the estimated second channel coefficient; and a slave Rake finger for determining the first and second symbols, wherein the slave Rake finger comprises:

first and second decoding means coupled respectively to the first and second delay means for producing respective first and second composite signals;

second complex conjugate transforming means having an input for receiving the second composite signal and producing a complex conjugate of the second composite signal;

parallel-to-serial conversion means for interleaving the first composite signal and the complex conjugate of the second composite signal and providing an interleaved signal output; and a space time transmit diversity derotator having inputs for receiving said interleaved signal output, the estimated first channel coefficient and the complex conjugate of the estimated second channel coefficient and for recovering the first and second symbols.

2. The diversity receiver of claim 1, further comprising a down-sampling means coupled to an output of the derotator for down-sampling a signal on the output by a factor of two.

3. The diversity receiver of claim 1, wherein the master Rake finger further comprises:

a means for over-sampling a locally generated transmitter diversity pilot channel sequence;

a means for modulating the delayed second signal using the over-sampled locally generated transmitter diversity pilot channel sequence to produce a correlated delayed second signal; and a means for combining the delayed first signal and the correlated delayed second signal and supplying a combined signal to an estimation module for estimating the first and second channel coefficients.

4. A method of recovering symbols in a diversity receiver system, the method comprising the steps of:

receiving first and second signals at first and second antenna elements, the first signal comprising first and second consecutive symbols modified by a first channel coefficient, the second signal comprising the first and second symbols modified by a second channel coefficient;

delaying the first and second signals;

estimating the first and second channel coefficients by applying the delayed first and second signals to a master Rake finger having first and second outputs for the estimated the first and second channel coefficients;

producing a complex conjugate, of the estimated second channel coefficient;

producing first and second composite signals from the delayed first and second signals using a slave Rake finger by decoding the respective delayed first and second signals producing a complex conjugate of the second composite signal;

interleaving the first composite signal and the complex conjugate of the second composite signal and providing an interleaved signal output; and applying said interleaved signal output, the estimated first channel coefficient and the complex conjugate of the estimated second channel coefficient to a space time transmit diversity derotator (DM) for the recovery of the first and second symbols.

5. The method of claim 4, further comprising the step of down-sampling an output of the derotator by a factor of two.

6. The method of claim 4, wherein the first and second channel coefficients are determined by over-sampling a locally generated transmitter diversity pilot channel sequence, and further comprising the steps of:

modulating the delayed second signal using the over-sampled locally generated transmitter diversity pilot channel sequence to produce a correlated delayed second signal; and combining the delayed first signal and the correlated delayed second signal and using the combined signal to estimate the first and second channel coefficients.

7. A wireless equipment comprising a transmitter and a diversity receiver of claim 1.

8. A cellular communications network, comprising:

a least one base station having at least one transmitter for transmitting signals on a downlink to at least one receiver for receiving signals transmitted on an uplink by the at least one wireless equipment and at least one diversity receiver, wherein the at least one diversity receiver, comprises:

first and second antenna to receive first and second signals, the first signal comprising first and second consecutive symbols modified by a first channel coefficient, the second signal comprising the first and second symbols modified by a second channel coefficient;

first and second signal delay elements coupled respectively to the first and second antenna;

a master Rake finger module to estimate the first and second channel coefficients, the master Rake finger module comprising:

first and second inputs coupled respectively to the first and second delay element sand first and second outputs respectively for estimates of the first and second channel coefficients;

first complex conjugate transforming unit coupled to the second output for producing the complex conjugate of the estimated second channel coefficient; and a slave Rake finger configured to determine the first and second symbols, wherein the slave Rake finger comprises:

a first and second decoding elements coupled respectively to the first and second delay elements configured to produce respective first and second composite signals;

second complex conjugate transforming element comprising an input for receiving the second composite signal and configured to produce a complex conjugate of the second composite signal;

parallel-to-serial conversion unit configured to interleave the first composite signal and the complex conjugate of the second composite signal and providing an interleaved signal output; and a space time transmit diversity derotator comprising inputs to receive said interleaved signal output, the estimated first channel coefficient and the complex conjugate of the estimated second channel coefficient and for recovering the first and second symbols.

9. The cellular communications network of claim 8, wherein the slave rake finger further comprises a down-sampling means coupled to an output of the derotator for down-sampling a signal on the output by a factor of two.

10. The cellular communications network of claim 8, wherein the master Rake finger further comprises:

a unit configured to over-sample a locally generated transmitter diversity pilot channel sequence;

a modulating unit configured to modulate the delayed second signal using the over-sampled locally generated transmitter diversity pilot channel sequence to produce a correlated delayed second signal; and a combiner unit to combine the delayed first signal and the correlated delayed second signal and supplying a combined signal to an estimation module for estimating the first and second channel coefficients.

* * * * *